April 15, 1930.                G. R. TOWNSEND                1,755,139
                        CONTROL SYSTEM AND APPARATUS
                         Original Filed Aug. 5, 1927
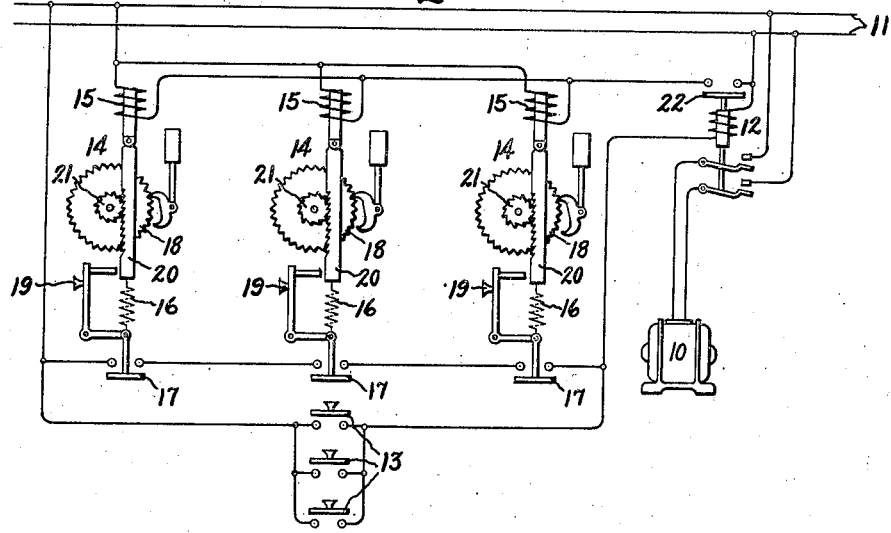
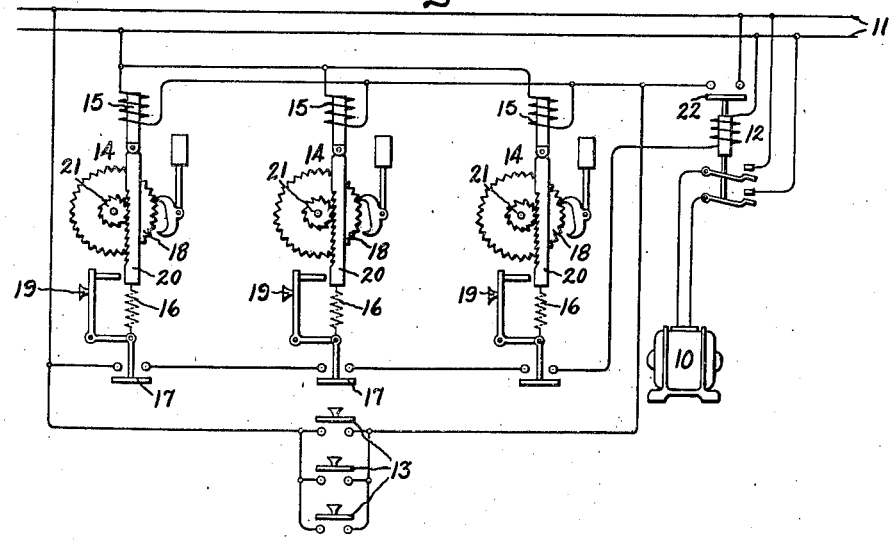
Inventor:
George R. Townsend,
by
His Attorney.

Patented Apr. 15, 1930

1,755,139

UNITED STATES PATENT OFFICE

GEORGE R. TOWNSEND, OF SCHENECTADY, NEW YORK, ASSIGNOR TO GENERAL ELECTRIC COMPANY, A CORPORATION OF NEW YORK

CONTROL SYSTEM AND APPARATUS

Application filed August 5, 1927, Serial No. 210,971. Renewed September 16, 1929.

This invention relates to the control of electric circuits particularly where provision is made for controlling the circuit automatically in accordance with variations in some predetermined condition such as under-voltage or the like and also at will independently of the predetermined condition.

The copending application of Benjamin W. Jones, Serial No. 157,815, filed December 29, 1926, and assigned to the assignee of my present invention describes and broadly claims an apparatus and system for providing circuit control of the above character and the present invention provides further improvements in such control systems and apparatus.

As described in the said Jones application, the operation of an electroresponsive circuit controlling switch is controlled both automatically and manually by means of a time element under-voltage and instantaneous manual controlling device. The operating electromagnets of both the electroresponsive switch and the undervoltage device are connected under master push button control to be energized in accordance with the voltage of the circuit controlled by the switch and the time element device functions automatically to interrupt the energizing circuit for the electroresponsive switch a time interval after the occurrence of predetermined under voltage conditions. However, due to variations in the design and construction of the operating electromagnets of the switch and the under-voltage device, it may happen that the electroresponsive switch itself will respond to certain under-voltage conditions so as to open the circuit even though the under-voltage conditions are not sufficiently severe to effect automatic operation of the time element undervoltage controlling device for the switch. Thus, for example, the electroresponsive switch may respond to a 50% reduction in the voltage while the time element under-voltage device itself may not respond to interrupt the energizing circuit of the electroresponsive switch until a 75% reduction in voltage occurs. Under these conditions a motor or other electric translating device having its power connections controlled by the electroresponsive switch will be deenergized and stopped due to opening of the switch during a prolonged reduction in voltage of between 50 and 75%. However, upon the return of normal voltage conditions, the electroresponsive switch will immediately reclose because the time element device has not responded, and the motor or other electric translating device controlled thereby thus suddenly and automatically will be set into operation again. With the motor or other device connected to operate machinery or the like, it will be evident that the unexpected automatic restarting thereof upon the return of normal voltage conditions is dangerous and may result in serious injury to the operators of the machinery or in other damage.

One of the principal objects of the present invention is to eliminate this source of danger in an automatic undervoltage circuit protective system of the above character.

Briefly, this is accomplished by interconnecting the electroresponsive circuit controlling switch and the time element undervoltage controlling device therefor so as to permit operation at will under the control of master switch mechanism and at the same time arranging the connections between the switch and the undervoltage device in such manner that upon automatic operation of either the switch or the undervoltage device in response to undervoltage conditions, each controls the energizing circuit of the other to prevent reclosure of the switch after the elapse of a certain time interval except under control of the master switch. In this way should the electroresponsive switch respond to undervoltage conditions to which the undervoltage device remains unresponsive, the switch upon opening interrupts the energizing circuit of the time element undervoltage device and thereby sets the latter into operation to interrupt the energizing circuit of the switch itself after the elapse of the time interval required for operation of the time element device. Thus, should the undervoltage condition exist only for a short interval as is usually the case in commercial power circuits, the time delay action of the undervoltage protective device serves to maintain the energizing circuit of the electroresponsive switch established and thereby permit reclosure of the switch upon the return of normal voltage conditions. If, on the other hand, the undervoltage condition persists for an extended time interval such that the operation of the motor or other device controlled by the switch necessarily would be stopped, the time element undervoltage device operates in a limited time to interrupt the energizing circuit of the electroresponsive switch and thereby effectively prevents reclosure of the switch upon the return of normal voltage conditions except upon operation of the manual starting control switch.

The accompanying drawing illustrates diagrammatically the preferred embodiments of the present invention in a combined automatic undervoltage and manual control system of the type described in the Jones application previously mentioned. Figs. 1 and 2 are schematic circuit diagrams illustrating two different ways in which the present invention may be embodied in such a motor control system.

As shown in Fig. 1, the connection of the motor 10 with the supply lines 11 is controlled by the electroresponsive switch or contactor 12. The motor 10 is shown of the single phase alternating current type although it will be understood that the present invention also may be embodied in any ordinary type of multiphase alternating current or direct current motor control. The electroresponsive switch 12 is closed under the control of any one of the several manual start push buttons 13, each of which is biased to the open position as indicated in the drawing.

Upon closure of switch 12 the energizing circuit for the operating winding thereof is under the control of the electroresponsive time element undervoltage devices 14, each of which preferably is of the type described in the previously mentioned Jones application. Briefly described, the automatic undervoltage controlling devices 14 provide for opening the energizing circuit of the switch 12 a time interval after the occurrence of predetermined under-voltage conditions in the circuit controlled by the switch 12, as well as instantaneous manual interruption of the energizing circuit of the switch 12 at will. Each device is provided with an operating electromagnet 15 which is connected through the spring 16 to operate the contact 17 to the closed position upon energization of the electromagnet. The time element mechanism 18, preferably of the clock escapement type as indicated in the drawing, is connected by suitable gearing, such as the rack 20 and the ratchet pinion 21, with each undervoltage device so as to delay the opening of the contact 17 for a time interval after a predetermined reduction in the energization of the operating electromagnet 15. In addition, the manually operable push button 19 is connected to operate the contact 17 to the circuit opening position independently of the operating electromagnet 15. The manual push button 19 also is arranged to render the time element mechanism 18 ineffective by mechanically moving the rack member 20 out of engagement with the cooperating ratchet pinion 21, thus producing instantaneous manual operation of the time element undervoltage device. In this way the push buttons 13 and 19 provide master switch control for closing and opening the motor line switch 12 substantially instantaneously at will, while the time element undervoltage devices 14 automatically provide time element undervoltage protection whenever the motor line switch 12 is closed, as will be pointed out more fully in the following description of the operation of the control system illustrated in Fig. 1.

The plurality of time element under-voltage devices 14, together with the plurality of starting and stop push buttons 13 and 19 are provided as shown in the drawing to permit the manual control of the motor line switch 12 from any one of a plurality of points, one of the under-voltage devices and a corresponding one of the starting and stop push buttons being located at each of the desired points of control. It will be understood that a greater or lesser number of undervoltage devices and push buttons may be used as desired.

With the supply lines 11 energized from a suitable source, the switch 12 responds immediately to operation of any one of the manual start push buttons 13 to connect the motor 10 to the supply line 11, the energizing circuits being obvious. Upon closure of switch 12 the auxiliary contact 22 immediately completes a circuit through which the operating electromagnets 15 of the several time element undervoltage devices are energized in parallel circuit in accordance with the voltage of the circuit controlled by the switch 12. As a result each electromagnet immediately operates the corresponding contact 17 to the closed position, thereby establishing a holding circuit through the several contacts 17 for maintaining the operating winding of switch 12 energized independently of the starting push buttons 13.

With the connections established as just described and illustrated in Fig. 1, the operating winding of the switch 12 and the operating electromagnets 15 of the time element undervoltage devices each are responsive to a reduction in the voltage of the supply lines 11. In case the design and construction of the operating electromagnet of switch 12 is such that upon a reduction in the voltage of the supply lines 11, the switch 12 drops out at a lesser percentage undervoltage than the operating electromagnet 15 of the undervoltage devices, nevertheless the undervoltage devices are at once set into operation to open the contact 17. This is due to the fact that the energizing circuit for the undervoltage devices is interrupted at the contact 22 of switch 12. Thus, after the elapse of a time interval determined by the time delay mechanism 18, the rack 20 of each undervoltage device returns to the position shown in the drawing, thereby permitting the contact 17 to open the energizing circuit of the switch 12. If the voltage of the supply line 11 returns to its normal value before the elapse of the time interval required for opening the contact 17, the switch 12 will immediately respond to reconnect the motor 10 to the supply line. When the time delay in the opening of contact 17 is relatively short, as for example about one second, the motor 10 will not have had time to stop or slow down to an appreciable extent. Consequently, the occurrence of the momentary undervoltage condition scarcely will be detected in the operation of motor 10.

If, however, the undervoltage condition of the supply lines 11 should persist for an extended interval beyond that required for operation of the contact 17 to the open position, the energizing circuit of the switch 12 is interrupted by the opening of contact 17. Hence the switch is unable to close automatically upon the return of the undervoltage condition. After such a long continued undervoltage condition, it is necessary to again operate one of the start push buttons 13 in order to effect restarting the motor 10 in the manner previously described.

As shown in Fig. 2, the connections between the switch 12, the start push buttons 13 and the time element electroresponsive undervoltage devices are slightly modified so that the operation is as follows: Upon closure of one of the start push buttons 13 the electromagnets 15 of the time element undervoltage devices are first energized in multiple circuit from the supply lines 11. The undervoltage devices at once operate to close the contact 17 and thereby complete the energizing circuit for the operating electromagnet of the switch 12. Upon closure of switch 12 the contact 22 serves to establish a holding circuit for the operating electromagnets 15 of the time element devices independently of the start push buttons 13. With the switch 12 and the electroresponsive time element undervoltage devices energized in accordance with the voltage of the supply line, the operation is exactly the same as previously described upon the occurence of both temporary and prolonged undervoltage conditions.

With either connection it will be observed that the start push buttons 13 and the stop push buttons 19 provide for operating the switch 12, as well as the undervoltage devices, to either the circuit closing or the circuit opening positions at will while, as previously pointed out, the opening of switch 12 in response to undervoltage conditions interrupts the energizing circuit of the undervoltage devices and the latter in turn upon time delayed response thereof operate to interrupt the energizing circuit of the switch 12.

While the present invention has been described as embodied in undervoltage circuit protective systems, it will be understood that it may be applied with equal advantage in other service.

What I claim as new and desire to secure by Letters Patent of the United States, is:

1. In a time element control, the combination of an element automatically operable with a time delay in response to variations in a predetermined condition, a second element under the control of said first element and automatically operable independently thereof in response to variations in a predetermined condition, and connections between the elements through which the second element controls the first element to effect time delay operation thereof upon automatic operation of the second element.

2. The combination of a plurality of cooperating electroresponsive control elements, each independently operable between two positions in response to predetermined variations in an electrical condition and each having means associated therewith for controlling the operation of the remaining devices independently of said predetermined variations in the electrical condition, and means for effecting operation of the said plurality of cooperating elements to each position independently of said predetermined variations in the electrical condition.

3. In a time element control, the combination with an electroresponsive device biased to one position and operable to another position, a second electroresponsive device operable to one position and biased to operate therefrom to another position with a time delay action, means through which the first device establishes an energizing circuit for the second device upon operation of the first device to said other position and interrupts the energizing circuit for the second device to permit time delay operation thereof to said other position upon operation of the first device to said one position, and means through which the second device interrupts the energizing circuit of the first device after time delay operation thereof.

4. In a time element control, the combination of an electroresponsive device operable automatically between two positions in response to predetermined variations in an electrical condition, a second electroresponsive device operable between two positions and biased for operation with a time delay action to one of said positions in response to predetermined variations in an electrical condition and connections between the said electroresponsive devices through which the first device controls the energizing circuit of the second device to effect time delay operation thereof to said one position upon automatic operation of the first device to a predetermined one of said positions and through which the second device controls the energizing circuit of the first device to prevent automatic operation thereof from said one position after time delay operation of the second device.

5. In a time element control, the combination with master switch mechanism, of a plurality of electroresponsive devices each operable at will to either of two positions under the control of said master switch mechanism and each automatically operable to one of said positions in response to variations in a predetermined condition independently of said master switch mechanism, time delay mechanism for retarding the automatic operation of one of said elements, and connections between the elements through which time delay operation of said one element is effected upon automatic operation of another of the said elements.

6. In a time element control, the combination of an electroresponsive circuit controlling device operable automatically to a predetermined circuit controlling position in response to a predetermined reduction in the energization thereof, and a time element electroresponsive circuit controlling device connected to interrupt the energizing circuit of the first device after time delay operation thereof and connected to be set into time delay operation under the control of the first device upon operation of the first device to said predetermined circuit controlling position.

7. In a circuit controlling system, the combination of master switch mechanism and a plurality of cooperating electroresponsive circuit controlling switches connected to be operated at will to each of a plurality of circuit controlling positions under the control of said master switch mechanism and each separately operable to a predetermined circuit controlling position in response to variations in a predetermined condition independently of said master switch mechanism, and connections between the switches whereby each switch upon automatic operation thereof insures the operation of the remaining switches to said predetermined circuit controlling positions.

8. In a circuit controlling system, the combination of master switch mechanism and a plurality of cooperating electroresponsive switches connected to be operated in a predetermined sequence under the control of said master switch mechanism, and each separately operable to a predetermined circuit controlling position in response to different variations in a predetermined condition independently of said master switch mechanism, and connections between the switches permitting each switch upon automatic operation thereof to said predetermined circuit controlling position to control the energizing circuit of the remaining switches to insure operation thereof to said predetermined circuit controlling position independently of the variations in the predetermined condition.

9. In a circuit controlling system, the combination of a circuit controlling switch biased for automatic operation to the circuit opening position in response to a predetermined reduction in the energization thereof, a cooperating electroresponsive switch biased for automatic operation to the circuit opening position in response to a predetermined reduction in the energization thereof and connected to interrupt upon automatic operation thereof the energizing circuit of the first switch, connections through which the first switch interrupts the energizing circuit of the second switch upon automatic operation thereof, and master switch mechanism for controlling the energization of said first and second switches to effect operation thereof to the circuit closing and the circuit opening position at will.

10. In a time element circuit controlling system, the combination of master switch mechanism and a plurality of cooperating electroresponsive switches connected to be operated substantially instantaneously under the control of said master switch mechanism to and from predetermined circuit controlling positions at will and each separately operable from certain of said circuit controlling positions in response to predetermined conditions independently of the control of said master switch mechanism, time delay means for retarding the automatic operation of at least one of said switches in response to said conditions, and connections between the switches permitting each switch upon automatic operation thereof to control the energizing circuit of the remaining switches.

11. In a circuit controlling system, the combination of an electromagnetic switch operable to the circuit closing position upon energization thereof and biased for operation to the circuit opening position, a normally open control switch for energizing said electromagnetic switch to effect operation thereof to the circuit closing position, an electroresponsive relay having an operating winding connected to be energized upon closure of the electromagnetic switch and a contact connected to establish an energizing circuit for the electromagnetic switch independently of said normally open control switch upon energization of the operating winding of the relay, and time element means associated with the relay for delaying operation of the relay contact to interrupt the energizing circuit for the electromagnetic switch for a time interval after the deenergization of the operating winding of the relay upon the opening of the electromagnetic switch due to the occurrence of under-voltage conditions in the energizing circuit thereof.

12. The combination with a circuit controlling switch biased to the circuit opening position and having an electromagnet energized in accordance with the voltage of the circuit controlled thereby for maintaining the switch in the closed position, a time element undervoltage relay for opening the energizing circuit of said electromagnet a time interval after a predetermined reduction in the voltage of the circuit controlled thereby, and connections through which the switch opens the energizing circuit of said time element undervoltage relay upon operation of the switch to the circuit opening position.

13. An undervoltage circuit protective system including an electromagnetic circuit controlling switch connected to be energized in accordance with the voltage of the circuit controlled thereby and biased to operate to the circuit opening position upon a reduction in the voltage of said circuit below a predetermined value, an electroresponsive time element relay for controlling the energizing circuit of said electromagnetic switch, and connections through which the switch upon operation thereof in response to undervoltage conditions sets the said time element electroresponsive relay into operation to interrupt the energizing circuit of the switch a predetermined time interval thereafter.

14. An undervoltage circuit protective system including a circuit controlling switch biased to the circuit opening position and having an electromagnet connected to be energized in accordance with the voltage of the circuit controlled by the switch for maintaining the switch in the circuit closing position, a time element undervoltage relay connected to be energized in accordance with the voltage of the circuit controlled by the switch and operable to open the energizing circuit of said electromagnet upon a reduction in the voltage of the circuit below a predetermined value, and connections through which upon operation of said switch to the circuit opening position in response to a lesser reduction in the voltage of said circuit the energizing circuit of said time element electroresponsive relay is opened to set the relay into operation to open the energizing circuit of the electromagnet a time interval after the said opening of said switch to prevent the reclosing of said switch upon the return of normal voltage conditions in the circuit.

15. An undervoltage circuit protective system including an electroresponsive switch biased to the circuit opening position, a master switch biased to the circuit opening position and operable to the circuit closing position to complete an energizing circuit for said electroresponsive switch to effect operation thereof to the circuit closing position, an electroresponsive time element undervoltage device having an operating winding connected to be energized in accordance with the voltage of the circuit controlled by the said electroresponsive switch upon closure thereof and a contact mechanism arranged to maintain the energizing circuit of the said electroresponsive switch closed independently of said master switch during normal voltage conditions and to interrupt the energizing circuit of the said electroresponsive switch a time interval after the occurrence of undervoltage conditions.

16. A circuit controlling system comprising an electroresponsive switch biased to the circuit opening position, a plurality of separately operable control switches each connected to effect the operation of said switch to the circuit closing position, and a plurality of time element undervoltage devices, one for each of said control switches, and connected to be rendered effective upon closure of the first switch to maintain the electroresponsive switch energized independently of said control switches during normal voltage conditions in the circuit controlled thereby and to interrupt the energizing circuit of the electroresponsive switch a time interval after the occurrence of undervoltage conditions.

17. An undervoltage circuit protective system comprising an electroresponsive switch biased to the circuit opening position, a time element undervoltage relay connected upon closure of the switch to be energized in accordance with the voltage of the circuit controlled by the switch and arranged to maintain the switch energized in accordance with the voltage of the circuit controlled thereby under normal voltage conditions and to interrupt the energizing circuit of the switch a time interval after the occurrence of undervoltage conditions in the circuit controlled by the switch, and manually operable means for controlling the energization and deenergization of the time element relay and the switch at will.

18. In a protective control system for an electric translating device, the combination of an electroresponsive switch for controlling the connection of the device to a source of supply and biased to the circuit opening position, a time delay undervoltage relay connected upon closure of the switch to be energized in accordance with the voltage impressed upon the translating device and arranged to open the energizing circuit of said electroresponsive switch a time interval after a predetermined reduction in the voltage impressed upon the translating device, and master switch mechanism for controlling the energization and deenergization of said relay and switch at will.

19. The combination of an electric motor, an electroresponsive line switch therefor, an electroresponsive time element undervoltage relay connected to effect operation of said line switch to the circuit opening position upon the occurrence of undervoltage conditions in the motor circuit, manual control means for effecting operation of the motor line switch to the circuit closing and the circuit opening positions at will and connections through which the line switch effects time delay operation of the time element undervoltage relay upon operation of the line switch to the circuit opening position.

20. The combination of an electric motor, an electromagnetic line switch therefor biased to the circuit opening position, master switch mechanism for controlling the energizing circuit of said line switch to open and close the motor circuit at will, and a time element undervoltage relay having an operating winding connected to be energized in accordance with the voltage of the motor circuit upon the closure of said line switch and having a contact connected to control the energization of said line switch to effect operation thereof to the open position a time interval after the occurrence of undervoltage conditions in the motor circuit.

In witness whereof, I have hereunto set my hand this 3d day of August, 1927.

GEORGE R. TOWNSEND.